United States Patent
Friedman (10) Patent No.: US 10,275,424 B2
(45) Date of Patent: Apr. 30, 2019

(54) SYSTEM AND METHOD FOR LANGUAGE EXTRACTION AND ENCODING

(71) Applicant: The Trustees of Columbia University in the City of New York, New York, NY (US)

(72) Inventor: Carol Friedman, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 14/166,160

(22) Filed: Jan. 28, 2014

(65) Prior Publication Data
US 2014/0142924 A1 May 22, 2014

Related U.S. Application Data (63) Continuation of application No. PCT/US2012/048251, filed on Jul. 26, 2012.

(60) Provisional application No. 61/513,321, filed on Jul. 29, 2011.

(51) Int. Cl.
*G06F 17/21* (2006.01)
*G06F 17/27* (2006.01)

(52) U.S. Cl.
CPC .......... *G06F 17/21* (2013.01); *G06F 17/2765* (2013.01)

(58) Field of Classification Search
CPC .. G06F 17/2705; G06F 17/271; G06F 17/274; G06F 17/2775; G06F 17/2765; G06F 17/21
See application file for complete search history.

(56) References Cited

U.S. PATENT DOCUMENTS

| | | | |
|---|---|---|---|
| 4,965,763 A | 10/1990 | Zamora | |
| 5,251,131 A | 10/1993 | Masand et al. | |
| 5,265,065 A | 11/1993 | Turtle | |
| 5,327,341 A | 7/1994 | Whalen et al. | |
| 5,377,103 A | 12/1994 | Lamberti et al. | |
| 5,551,022 A | 8/1996 | Tariq et al. | |
| 5,799,268 A | 8/1998 | Boguraev | |
| 5,809,476 A | 9/1998 | Ryan | |
| 5,832,496 A | 11/1998 | Anand et al. | |
| 6,038,668 A | 3/2000 | Chipman et al. | |
| 6,055,494 A | 4/2000 | Friedman | |
| 6,076,088 A | 6/2000 | Paik et al. | |
| 6,182,029 B1* | 1/2001 | Friedman | 704/9 |
| 6,965,857 B1* | 11/2005 | Decary | G06F 17/2705 704/1 |
| 2004/0034525 A1* | 2/2004 | Pentheroudakis | G06F 17/2735 704/9 |
| 2006/0020493 A1 | 1/2006 | Cousineau et al. | |
| 2007/0179776 A1 | 8/2007 | Segond et al. | |
| 2008/0243834 A1* | 10/2008 | Rieman | G06F 17/276 |
| 2009/0119095 A1 | 5/2009 | Beggelman et al. | |

(Continued)

OTHER PUBLICATIONS

U.S. Appl. No. 08/738,889 (U.S. Pat. No. 6,055,494), filed Oct. 28, 1996 (Apr. 25, 2000).

(Continued)

*Primary Examiner* — Angela A Armstrong
(74) *Attorney, Agent, or Firm* — Baker Botts L.L.P.

(57) ABSTRACT

Improved systems and methods for extracting information from medical and natural-language text data.

9 Claims, 4 Drawing Sheets

(56) References Cited

U.S. PATENT DOCUMENTS

2009/0204596 A1 8/2009 Brun et al.
2009/0259459 A1 10/2009 Ceusters et al.

OTHER PUBLICATIONS

U.S. Appl. No. 09/370,329 (U.S. Pat. No. 6,182,029), filed Aug. 6, 1999 (Jan. 30, 2011).
International Search Report and Written Opinion for PCT/US2012/048251, dated Sep. 28, 2012.
Baud et al., "Natural Language Processing and Semantical Representation of Medical Texts", *Methods of Information in Medicine*, 31(2):117-125 (1993).
Bennahum, "Docs for Docs", *Wired*, pp. 100, 102 and 104 (1995).
Dolin et al., "SGML as a Message Interchange format in Healthcare", *Proceedings of the 1997 Fall AMIA Annual Symposium*, pp. 635-639 (1997).
Friedman et al., "Architectural Requirements for a Multipurpose natural Language Processor in the Clinical Environment", *Proceedings of the 19th Annual Symposium on Computer Applications in Medical Care*, pp. 347-351 (1995).
Friedman et al., "Natural Language Processing in an Operational Clinical Information System", *Natural Language Engineering*, 1(1):83-108 (1995).
Friedman et al., "A Schema for Representing Medical Language Applied to Clinical Radiology", *Journal of the American Informatics Association*, 1(3):233-248 (1994).
Friedman et al., "A General Natural-Language Text Processor for Clinical radiology", *Journal of the American Medical Informatics Association*, 1(2):161-174 (1994).
Friedman et al., "A Conceptual Model for Clinical Radiology Reports", *17th Symposium for Computer Applications in Medical Care*, pp. 829-833 (1994).

Guedj et al., "A Chart Parser to Analyze Large Medical Corpora", *Proceedings of the 16th Annual International Conference of the IEEE Engineering in Medicine and Biology Society*, pp. 1404-1405 (1994).
Gundersen et al., "Development and Evaluation of a Computerized Admission Diagnoses Encoding System", *Computers and Biomedical Research*, 29 (Article No. 0026):351-372 (1996).
Haug et al., "Computerized Extraction of Coded Findings from Free-Text Radiologic Reports", *Radiology*, 174:543-548 (1990).
Hripcsak et al., "Unlocking Clinical Data from Narrative Reports: A Study of Natural Language Processing", *Ann. Intern. Med.*, 122(9):681-688 (1995).
Jones et al., "Artificial intelligence Program for Indexing automatically (AIPIA)", *16ht International Online Information Meeting Proceedings, Learned Inf Oxford*, pp. 187-196 (1992).
Lenert et al., "Automated Linkage of Free-text Descriptions of Patients with a Practice Guideline", *Proceedings of the 17th Annual SCAMC*, pp. 274-278 (1994).
Lovis et al., "Natural Language Processing and Clinical Support to Improve the Quality of Reimbursement Claim Databases", *Proceedings of the 1996 Fall AMIA Annual Symposium*, p. 899 (1996).
Rubin, "Can't reach your doctor? Try Email", *U.S. News & World Report*, pp. 82-83 (Feb. 13, 1995).
Sager et al., "Medical Language Processing with SGML Display", *Proceedings of the 1996 Fall AMIA Annual Symposium*, pp. 547-551 (1996).
Zweigenbaum et al., "A Multi-Lingual Architecture for Building a Normalised Conceptual Representation from Medical Language", *Proceedings of the 19th Annual SCAMC*, pp. 357-361 (1995).
Zweigenbaum et al., "From Text to Knowledge: A Unifying Document-Centered View of Analyzed Medical Language", *Workshop on Medical Concept Representation and Natural Language Processing, IMIA WG-6*, pp. 21-29 (1997).

* cited by examiner

FIG. 4

SYSTEM AND METHOD FOR LANGUAGE EXTRACTION AND ENCODING

CROSS-REFERENCE TO RELATED APPLICATION

This application claims priority to PCT/US2012/048251, filed Jul. 26, 2012 and U.S. Provisional Ser. No. 61/513,321, titled "System and Method for Language Extraction and Encoding," filed Jul. 29, 2011, the disclosures of which are hereby incorporated by reference in their entireties.

STATEMENT REGARDING FEDERALLY SPONSORED RESEARCH

This invention was made with government support under grants LM005397, LM006274, LM007659, and LM008635 awarded by the National Institutes of Health. The Government has certain rights in this invention.

BACKGROUND

Technical Field

The present application relates to natural language processing ("NLP").

In the biological domain, it has been recognized that to achieve interoperability and improved comprehension, it is important for text processing systems to map extracted information to ontological concepts. For example, U.S. Pat. No. 6,182,029 to Friedman (expressly incorporated herein by reference), discloses techniques for processing natural language medical and clinical data, commercially known as MedLEE (short for Medical Language Extraction and Encoding). In one embodiment, a method is presented where natural language data is parsed into intermediate target semantic forms, regularized to group conceptually related words into a composite term (e.g., the words enlarged and heart may be brought together into one term, "enlarged heart") and eliminate alternate forms of a term, and filtered to remove unwanted information. MedLEE differs from the other NLP coding systems in that the codes are shown with modified relations so that concepts may be associated with temporal, negation, uncertainty, degree, and descriptive information, which affects the underlying meaning and are critical for accurate retrieval of subsequent medical applications.

In summary, MedLEE provides medical and natural language processing techniques that provide structured data output that can be used for a variety of different applications across a variety of different computing platforms. The present disclosure provides improvements to existing methods and systems for medical and natural language processing, including MedLEE.

SUMMARY

Disclosed herein are improvements to natural language processing systems and methods e.g., MedLEE, for extracting information from a medical or natural language document input, that can be easily adapted for use in a variety of areas of expertise by modifying, if necessary, one or more corresponding knowledge components. MedLEE is described in U.S. Pat. No. 6,182,029, expressly incorporated herein by reference.

In one embodiment of the disclosed subject matter, the SICStus version of Prolog can be used, e.g., in place of Quintus Prolog.

Figure 1:
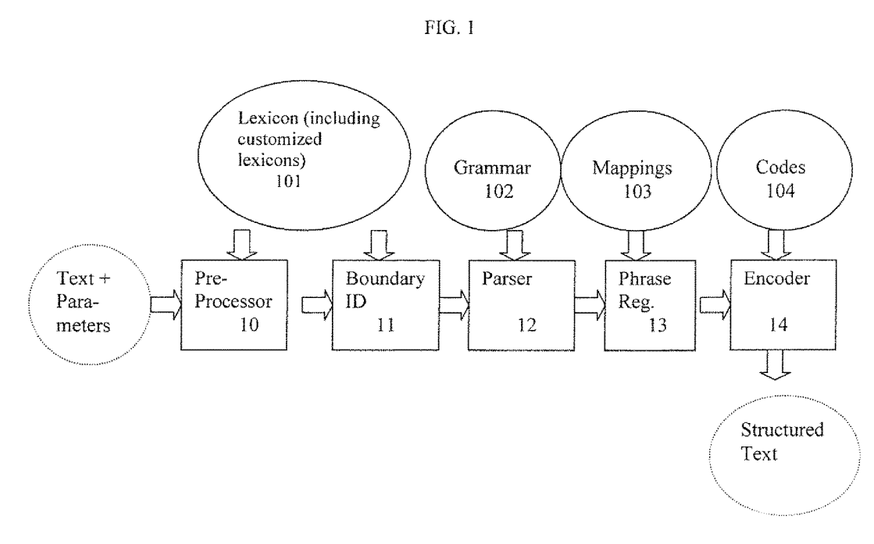
FIG. 1 is a block diagram of an information extraction system in accordance with some embodiments of the disclosed subject matter.

In some embodiments, the disclosed subject matter includes a preprocessor, optional boundary identifier, parser, phrase recognizer and an encoder to convert natural-language input text and parameters into structured text (see FIG. 1).

FIG. 1 shows a preprocessor module 10 by which natural-language input text is received. The preprocessor 10 uses the lexicon knowledge base 101 and handles abbreviations, which may be domain dependent. The preprocessor 10 thus performs lexical lookup to identify and categorize multi-word and single word phases within each sentence. The output of this component consists of a list of word positions where each position is associated with a word or multi-word phrase in the report.

In some embodiments of the disclosed subject matter, the preprocessor can extract relevant text, perform tagging so that irrelevant text is ignored or identified and sorted, handle parenthetical information, recognize boundaries of terms, e.g., biological terms and identify biological terms.

In some embodiments of the disclosed subject matter, the boundary identifier can identify section and sentence boundaries, drop irrelevant information, and utilize a lexicon lookup to implement syntactical and semantic tagging of relevant information. The boundary identifier can be associated with a lexicon module 101, which provides a suitable lexicon from external knowledge sources. The output of the boundary identifier can include a list of word positions where each position is associated with a word or multi-word phrase in the text. In addition, each portion in the list can be associated with a lexical definition consisting of semantic categories and a target output form.

In some embodiments of the disclosed subject matter, the parser can utilize the lexicon and grammar rules and categories assigned to the phrases of a sentence to recognize well-formed syntactic and semantic patterns in the sentence and to generate intermediate forms. The parser module 12 uses the lexicon 101, and a grammar module 102 to generate intermediate target forms. Thus, in addition to parsing of complete phrases, sub-phrase parsing can be used to advantage where highest accuracy is not required. In case a phrase cannot be parsed in its entirety, one or several attempts can be made to parse a portion of the phrase for obtaining useful information in spite of some possible loss of information.

In some embodiments of the disclosed subject matter, the phrase regulator 13 can replace parsed forms with a canonical output form specified in the lexical definition of the phrase associated with its position in the report.

In some embodiments of the disclosed subject matter, the encoder 14 can map received canonical forms into controlled vocabulary terms through a table of codes. The codes can be used to translate the regularized forms into unique concepts which are compatible with a controlled vocabulary.

In some embodiments of the disclosed subject matter, the last component, a tagger (not shown), is used to "tag" the original text data with a structured data component.

In some embodiments of the disclosed subject matter, users have the ability to dynamically change or add to a lexicon so they can customize the lexicon according to their needs. Filenames can contain the new lexical entries specified by the user. These entries do not require Prolog, but are read-in as data and processed. Examples of options for customized lexicons are the -dlex <Filename> option and the -nlex <Filename> option. In one embodiment, when the "dlex" option is used, the entries that are specified by the user replace the entries in the lexicon. For example, this embodiment can be used when using specialized domains to make the vocabulary and abbreviations more specific. In another embodiment, the customized lexicon is the "nlex option." For this option, users can augment lexical entries by adding to them, but they are not replaced.

In some embodiments of the disclosed subject matter, terms containing '.' that are part of a term, but are not sentence endings can be added using the -abfile entry. This entry assists in the process of separation of text into discrete sentences.

In some embodiments of the disclosed subject matter, the user can tag the input with special identification tags, such as, for example, 'date', and the system will recognize, accept and sort the entire tagged input as date information without going through the grammar rules for date. This mechanism allows for flexibility so that the user may have a special preprocessor for dates which will be accepted by the system. In related embodiments, this feature can be used for other special structures, such as recognizing names, phone number, addresses, locations, etc., with a slight adaptation of the system (to recognize the tags).

In some embodiments of the disclosed subject matter, another option provides for tags which provide recognition of certain text structures on input. For example, a user is enabled to have a specialized preprocessor which generates a nested structure (unlike 'date', as described above, whose value is a string), and the system will accept it, allowing for additional flexibility.

In some embodiments of the disclosed subject matter, disambiguation rules are dynamically loaded so that the rules can be changed without recompiling the rule. They are then read in as a knowledge component. This allows for more flexibility in the disambiguation rule set. In one embodiment, the rules are compiled using Prolog.

In some embodiments of the disclosed subject matter, users can also dynamically load the table so that they can specify their own coding table. This allows for flexibility because users can dynamically load the table using, for example, the -cfile <Filename> option, where the filename contains the coding table. In one embodiment, the table is compiled using Prolog. Therefore, the user can have the entries in the table and compile them, e.g., in Prolog, but they do not need to compile the file so that it is part of the system.

In some embodiments of the disclosed subject matter, an option is included that allows for a new entry to the coding table to be added to the system dynamically by a user, without requiring the rest of the coding table. This allows users to specify new entries that are not yet in. In other embodiments, there is a mechanism for users to remove unwanted entries.

In some embodiments of the disclosed subject matter, users have the ability to dynamically add section header names so that they can customize output to different types of document structures.

In some embodiments of the disclosed subject matter, an output form is generated by the system is, for example, flat and tabular. In one embodiment, this output form is ideal for storing the output (after some postprocessing) into a spreadsheet application, such as Excel, or into a database structure which can be used for rapid and standardized access.

The accompanying drawings, which are incorporated and constitute part of this disclosure, illustrate preferred embodiments of the invention and serve to explain the principles of the invention.

Throughout the drawings, the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION

Improved natural language processing ("NLP") systems and methods, e.g., MedLEE, are presented to process information extracted from a medical or natural language document input. The improvements to the systems and methods of the present disclosure provide for increased flexibility and control to the user in both the input and output of information. MedLEE is described in U.S. Pat. No. 6,182,029 to Friedman, expressly incorporated herein by reference.

FIG. 1 is a block diagram of an information extraction system in accordance with an embodiment of disclosed subject matter. The system includes preprocessor 10, boundary identifier 11, parser 12, phrase recognizer 13, and encoder 14. These system components use a lexicon 101, grammar rules 102, mappings 103 and codes 104 to convert natural-language input text and parameters received by the preprocessor 10 into structured text output by encoder 13. The preprocessor 10 receives natural-language and medical input text and parameters. The preprocessor utilizes the lexicon knowledge base 101, which provides a suitable lexicon from external knowledge sources. In some embodiments that will be further described with reference to FIG. 2, the preprocessor can extract relevant text, perform tagging so that irrelevant text is ignored or identified, handle parenthetical information and abbreviations, recognize phrase or sentence boundaries and generates a list form for each phrase for further processing by the parser module 12.

In one embodiment, the user can tag the input with special identification tags, such as, for example, 'date', and the system will accept the entire tagged input as "date information" without going through the grammar rules for date. This mechanism allows for flexibility so that the user can have a special preprocessor for dates which will be accepted by the system. In related embodiments, this feature can be used for other special structures, such as recognizing names, phone number, addresses, locations, etc., with a slight adaptation of the system (to recognize the tags).

In another embodiment, certain sentence structures are recognized on input. For example, a user is enabled to have a specialized preprocessor 10 which generates a nested structure (unlike 'date' whose value is a string), and the system will accept it, allowing for additional flexibility.

The output from preprocessor 10 is provided to boundary identifier 11. In some embodiments that will be further described with reference to FIG. 3, the boundary identifier 11 can identify section and sentence boundaries, drop irrelevant information, and utilize a lexicon lookup to implement syntactical and semantic tagging of relevant information. The boundary identifier 11 is also associated with the lexicon module 101.

The output of boundary identifier 11 can include a list of word positions where each position is associated with a word or multi-word phrase in the text. In addition, each portion in the list can be associated with a lexical definition consisting of semantic categories and a target output form.

The output from the boundary identifier 11 is provided to parser 12. In some embodiments, the parser 12 can utilize grammar 112 and categories assigned to the phrases of a sentence to recognize well-formed syntactic and semantic patterns in the sentence and to generate intermediate forms.

In some embodiments, the parser module 12 uses a lexicon 101 and a grammar module 102 to generate intermediate target forms. Thus, in addition to parsing of complete phrases, sub-phrase parsing can be used to advantage where highest accuracy is not required. In case a phrase cannot be parsed in its entirety, one or several attempts can be made to parse a portion of the phrase for obtaining useful information in spite of some possible loss of information.

In this form, the frame can represent the type of information, and the value of each frame is a number representing the position of the corresponding phrase in the report. In a subsequent stage of processing, the number can be replaced by an output form that is the canonical output specified by the lexical entry of the word or phrase in that position and a reference to the position in the text.

The parser can proceed by starting at the beginning of the sentence position list and following the grammar rules. When a semantic or syntactic category is reached in the grammar, the lexical item corresponding to the next available unmatched position can be obtained and its corresponding lexical definition is checked to see whether or not it matches the grammar category. If it does match, the position can be removed from the unmatched position list, and the parsing continued. If a match is not obtained, an alternative grammar rule can be tried. If no analysis can be obtained, an error recovery procedure can be followed so that a partial analysis is attempted.

The output from the parser 12 is provided to phrase regulator 13. In some embodiments of the disclosed subject matter, the regulator 13 can first replace each position number with the canonical output form specified in the lexical definition of the phrase associated with its position in the report. It also can add a new modifier frame, for example "idref", for each position number that is replaced, and insert contextual information into the extracted output so that contextual information is no longer a separate component. Further, the regulator 13 can also compose multi-word phrases, i.e., compositional mappings, which are separated in the documents.

The compositional mapping information 103 lists the components of complex terms. The encoder 14 receives the regulated phrases. In some embodiments of the disclosed subject matter, the encoder 14 maps received canonical forms into controlled vocabulary terms through a table of codes 104. The codes can be used to translate the regularized forms into unique concepts which are compatible with a controlled vocabulary.

A coding table 104 can be generated. In one arrangement, the table takes the form of ($A_1$, $A_2$, $A_3$, $A_4$), where $A_1$ represents the main finding used for efficiency, $A_2$ represents the type of main finding, $A_3$ represents a list of modifiers, and $A_4$ indicates the coding system, such as a preferred name in ontology.

A coding table can be dynamically loaded using the -cfile <Filename> option, where the filename contains the coding table. In one embodiment, the table is compiled using Prolog. The coding table is a knowledge component used by the system, but that component is dynamically loaded so that user can specify their own coding table instead of the default one. This allows for flexibility in that different or combined coding systems can be used, or the default coding system can be updated without recompiling the entire system. For example, users can "swap out" the coding table (it can be SNOMED, UMLS, ICD-10, etc.).

Users can also dynamically load the table so that they can specify their own coding table. Therefore, the user can have the entries in the table and compile them, e.g., in Prolog, but they do not need to compile the file so that it is part of the MedLEE system.

Another option allows for a new entry to the coding table to be added to the system dynamically by a user, without requiring the rest of the coding table. This allows users to specify new entries that are not yet included. In other embodiments, unwanted entries can be removed.

In a non-limiting embodiment, an output form that can be generated by the system is a flat and tabular output form. Other exemplary output forms include indented, line, nested, HL7, xml.

In one embodiment, this output form is ideal for storing the output (after some postprocessing) into a spreadsheet application, such as Excel, or into a database structure which can be used for rapid and standardized access. This output form can also be integrated this into structured legacy tables in the EMR system. For example, it can be used to store into a DB2 database, which is used for mining the information in the clinical notes for pharmacovigilance as well as finding other types of associations (disease-symptoms, disease comorbidities, etc).

Section header names can be dynamically added to the coding table so that the user can customize to different types of document structures. For example, this can be accomplished by specifying the -sfile <Filename> option where the file specified contains the section header specifications.

A tagger (not shown) can be used to "tag" the original text data with a structured data component.

Figure 2:
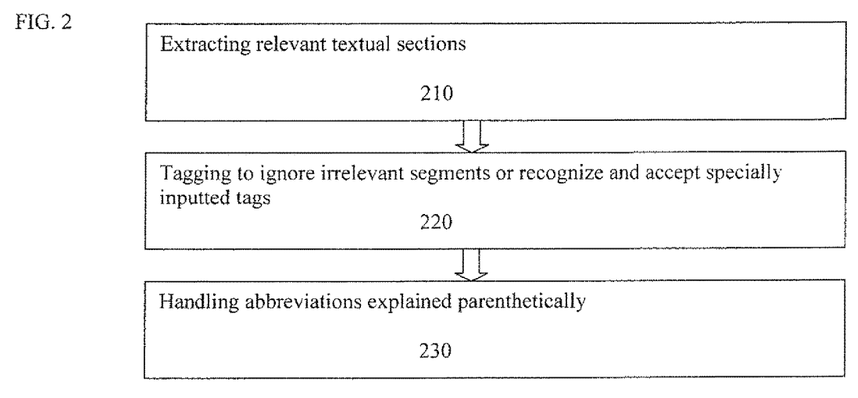
FIG. 2 is a diagram illustrating a method implemented in accordance with some embodiments of the disclosed subject matter in the preprocessor module 10 of FIG. 1.

Referring next to FIG. 2, an exemplary software embodiment of the preprocessor module 10 of FIG. 1 will be described. At 210, relevant textual sections, such as titles, abstracts, and results, are extracted from the input text. Relevant text is extracted from XML documents based on knowledge of which elements are textual elements. For example, in the case of a research article, the text of the title, abstract, introduction, methods, results, discussion, conclusion sections can be selected for processing, but not the text of the authors, affiliations, or acknowledgement sections.

Other types of text documents, such as HTML, can likewise be processed by employing suitable programming. This would entail looking for certain fonts (such as large bold) and certain strings, such as "methods".

The extracted text is tagged 220 so that certain segments of textual information, such as tables, background, and explanatory sentences, can be ignored going forward. Once such a segment is recognized, a tag, such as <ign>, can be placed at beginning of segment and a second tag, such as </ign>, can be placed at end of segment. Text between the "ign" tags can be subsequently ignored.

Next, abbreviated terms that are defined in the input text by way of parenthetical expressions can be operated on 230. The disclosed subject matter is not limited to these techniques and embraces alternative techniques for converting abbreviated terms and/or parenthetical information.

Figure 3:
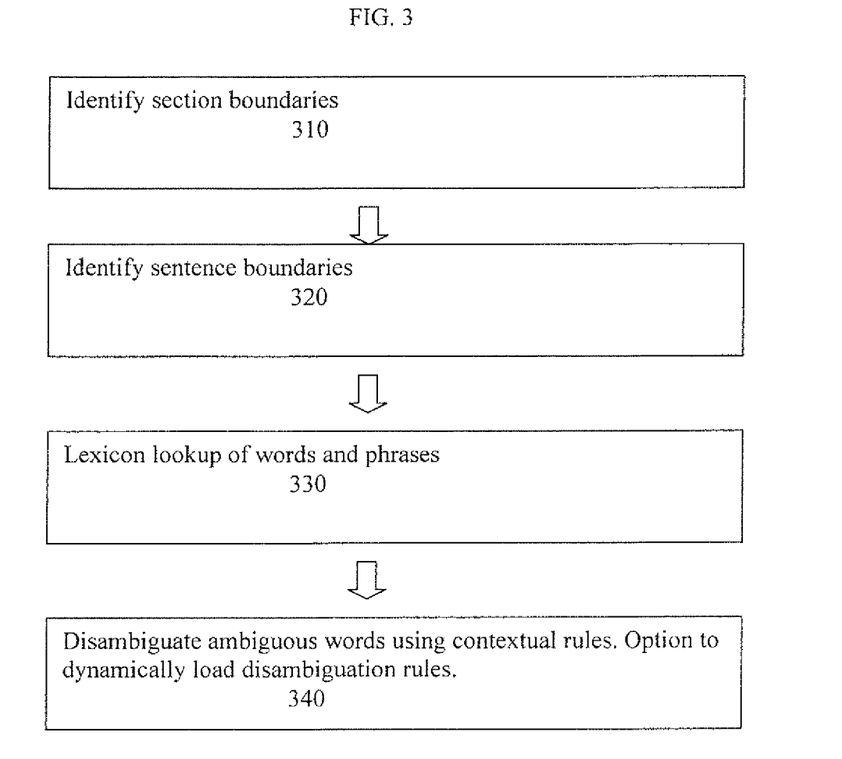
FIG. 3 is a diagram illustrating a method implemented in accordance with some embodiments of the disclosed subject matter in the boundary identification module 11 of FIG. 1.

Referring next to FIG. 3, an exemplary software embodiment of boundary identifier 11 of FIG. 1 will be described. First 310, section boundaries are identified. This can be accomplished using a list of known sections which identifies terms, e.g., by including a ':' Typical known sections include terms such as Abstract, Methods, Results, Conclusions.

Next 320, sentence boundaries are identified. Sentence boundaries are determined when there are certain punctuations, such as '.' and ';'. For '.' a procedure can be employed to test if the period is an abbreviation. If it is an abbreviation, it is not treated as the end of a sentence and the next appropriate punctuation is tested. In some embodiments of the disclosed subject matter, terms containing '.' that are part of a term, but are not sentence endings can be added using the -abfile entry. This entry assists in the process of separation of text into discrete sentences.

At 330, a lexicon look-up is performed. In some embodiments, this can involve both syntax tagging, e.g., to identify nouns and verbs within the text, and semantic tagging, e.g., to identify disease names, relations, functions, body locations, etc. During the look-up, certain information can be ignored by employing string matching, i.e., finding the longest string in the lexicon that matches the text. For example, in the text segment 'the liver and biliary primordium', 'the' can be ignored because it is in the list of words that can be ignored, 'liver' can be matched and the lexicon will specify that it is a body location, 'and' can be specified as a conjunction, and 'biliary primordium' as a body location.

Next 340, contextual rules can be used to disambiguate ambiguous words. This can be implemented through use of contextual disambiguation rules which can look at words following or preceding the ambiguous word or at the domain. In some embodiments of the disclosed subject matter, disambiguation rules are dynamically loaded so that the rules can be changed without recompiling the system. This allows for more flexibility in the disambiguation rule set. In one embodiment, the rules are be compiled using Prolog. For example, this can be accomplished by specifying the -cxfile <Filename> option, where the filename contains the set of rules. Therefore, the ruleset can be changed according to the user's needs, without compiling the entire system.

Returning to FIG. 1, the lexicon 101 can contain both terms and semantic classes, as well as target output terms. For example, lexical entries for cell ontology can include fibrobast, fibrobasts, fibrobastic, and the target form for all can be fibroblast. The lexicon can be created using an external knowledge source. For example, Cell Ontology can list the names of certain cells.

In some embodiments of the disclosed subject matter, users have the ability to dynamically change or add to a lexicon and the lexicon is customized according to the user's needs. In one embodiment, filenames can contain the new lexical entries specified by the user. These entries are read-in as data and processed.

Nonlimiting examples of options for customized lexicons are, e.g., the -dlex <Filename> option and the -nlex <Filename> option. Other options for customized lexicons can also be used. In one embodiment, when the "dlex" option is used, the entries that are specified by the user replace the entries in the lexicon. For example, this embodiment can be used when using specialized domains to make the vocabulary and abbreviations more specific.

In another embodiment, the customized lexicon is the "nlex option." For this option, users can augment lexical entries by adding to them, but they are not replaced.

The grammar rules 102 can check for both syntax and semantics, and constrain arguments of relation or function. The arguments themselves can be nestled such that rules build upon other rules.

The parser 12 operates to structure sentences according to pre-determined grammar rules 102. In some embodiments, the parser described in U.S. Pat. No. 6,182,029 to Friedman, the disclosure of which is incorporated by reference herein, can be used with certain modifications as the parser 12. The '029 patent describes a parser which includes five parsing modes, Modes 1 through 5, for parsing sentences or phrases The parsing modes are selected so as to parse a sentence or phrase structure using a grammar that includes one or more patterns of semantic and syntactic categories that are well-formed. If parsing fails, various error recovery techniques are employed in order to achieve at least a partial analysis of the phrase. These error recovery techniques include, for example, segmenting a sentence or phrase at pre-defined locations and processing the corresponding sentence portions or sub-phrases. Each recovery technique is likely to increase sensitivity but decrease specificity and precision. Sensitivity is the performance measure equal to the true positive information rate of the natural language system, i.e., the ratio of the amount of information actually extracted by the natural language processing system to the amount of information that should have been extracted. Specificity is the performance measure equal to the true negative information rate of the system, i.e., the ratio of the amount of information not extracted to the amount of information that should not have been extracted. In processing a report, the most specific mode is attempted first, and successive less specific modes are used only if needed.

Figure 4:
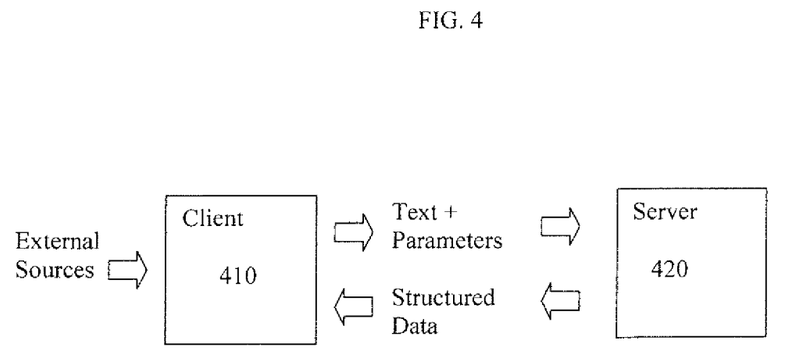
FIG. 4 is a block diagram of a system or application having an interface that may be used in connection with some embodiments of the system of FIG. 1.

Referring next to FIG. 4, a client computer 410 and a server computer 420 which are used in some embodiments to implement the natural language processing program of FIG. 1 are shown. The client 410 received articles or other information from external sources such as the Internet, extranets, typed input or scanned documents which have been preprocessed via optical character recognition. The client 410 transmits text and any parameter information included in the received information to the server 420. In return, the server 420 can provide the client 410 with structured data which results from processing as described in connection with FIGS. 1-3 above.

The components of FIG. 1 can be software modules running on computer 420, a processor, or a network of interconnected processors and/or computers that communicate through TCP, UDP, or any other suitable protocol. Conveniently, each module is software-implemented and stored in random-access memory of a suitable computer, e.g., a work-station computer. The software can be in the form of executable object code, obtained, e.g., by compiling from source code. Source code interpretation is not precluded. Source code can be in the form of sequence-controlled instructions as in Fortran, Pascal or "C", for example. Alternatively, a rule-based system can be used such as Prolog, e.g., the SICStus version of Prolog, where suitable sequencing is chosen by the system at run-time. The SICStus Prolog can be implemented within different platforms, including, for example, JAVA.

The foregoing merely illustrates the principles of the invention. Various modifications and alterations to the described embodiments will be apparent to those skilled in the art in view of the teachings herein. For example, pre-processor 10, boundary identifier 11, parser 12, phrase recognizer 13, and encoder 14 can be hardware, such as firmware or VLSICs, that communicate via a suitable connection, such as one or more buses, with one or more memory devices storing lexicon 101, grammar rules 102, mappings 103 and codes 104. It will thus be appreciated that those skilled in the art will be able to devise numerous techniques which, although not explicitly described herein, embody the principles of the invention and are thus within the spirit and scope of the invention.

The invention claimed is:

1. A method for extracting information from medical or natural-language input text, comprising:
    receiving, by a computing system, medical or natural-language input text, wherein one or more words or portions of said medical or natural-language input text includes an identification tag;
    selecting, by computing system, the input text using the identification tag to determine a relevant text input and an irrelevant text input, wherein the identification tag includes a string value and/or a nested structure value, wherein the identification tag is configured to be customized and recognized by a processor;
    utilizing, by the computing system, a lexicon knowledge base to identify and categorize multi-word and single word phrases within sentences of the relevant text input, wherein said lexicon knowledge base is configured to be dynamically customized by a user;
    receiving, from a user, filenames having new lexical entries, and modifying the lexicon knowledge based on the filenames;
    disambiguating, by the computing system, one or more ambiguous words in the relevant text input using a contextual disambiguation rule, wherein the contextual disambiguation rule is configured to analyze words following or preceding each ambiguous word, words in the same sentence, words in a certain section, and/or words in a certain domain, and wherein the contextual disambiguation rule is configured to be dynamically loaded without compiling the entire computing system;
    parsing, by the computing system, said relevant text input to determine a grammatical structure of the relevant text input, said parsing step comprising the step of referring to a domain parameter having a value indicative of a domain from which the text data originated, the domain parameter corresponding to one or more rules of grammar within a knowledge base related to the domain to be applied for parsing the relevant text input;
    regularizing, by the computing system, the parsed text data to form a canonical output form;
    converting, by the computing system, the canonical output form into controlled vocabulary terms using a table of codes, wherein the table of codes is configured to be dynamically customized without compiling the entire computing system;
    tagging, by the computing system, the input text with a structured data component derived from the controlled vocabulary terms; and
    outputting the tagged text data to be stored in a database.

2. The method of claim 1, wherein the identification tag is selected from the group consisting of dates, names, phone numbers, addresses, and locations.

3. The method of claim 1, wherein the tagged text data is stored in a form compatible with a standard spreadsheet application or relational database.

4. The method of claim 1, wherein the structure of the identification tag is configured to be updated with an adaptation of the processor.

5. A system for extracting information from medical or natural-language input text, comprising:
    a lexicon knowledge base to identify and categorize multi-word and single word phrases within sentences of a relevant input text, wherein said lexicon knowledge base is configured to be dynamically customized by a user by receiving, from the user, filenames having new lexical entries, and the lexicon knowledge is modified based on the filenames;
    a processor, coupled to said lexicon knowledge base and receiving said medical or natural-language input text, tagging one or more words or portions of said medical or natural-language input text with an identification tag, and selecting the input test using the identification tag to determine the relevant text input and an irrelevant text input, wherein the identification tag is configured to be customized by a user;
    a boundary identifier, coupled to said processor and said lexicon knowledge base and receiving said medical or natural-language input text and dropping the irrelevant text input;
    a parser, coupled to said boundary identifier and receiving said relevant input text to determine the grammatical structure of the relevant text input and generating a parsed text wherein one or more ambiguous words in the parsed data are disambiguated using a contextual disambiguation rule, wherein the disambiguation rule is configured to be dynamically loaded without compiling the entire computing system;
    a phrase regulator, coupled to said parser and replacing the parsed text with a canonical output form; and
    an encoder, coupled to said phrase regulator and receiving the canonical output form, converting the canonical output form into a controlled vocabulary term using a table of code, tagging the input text with a structured data component derived from controlled vocabulary terms, and outputting the tagged text data to be stored in a database, wherein the table of codes is configured to be dynamically customized without compiling the entire computing system.

6. The system of claim 5, wherein the identification tag is selected from the group consisting of dates, names, phone numbers, addresses, and locations.

7. The system of claim 5, wherein the tagged text data is stored in a form compatible with a standard spreadsheet application, a xml format, or relational database.

8. The system of claim 5, wherein the disambiguation rules are configured to be compiled by specifying the filename option, wherein the filename comprises the disambiguation rules.

9. The system of claim 5, wherein the structure of the identification tag is tag is configured to be updated with an adaptation of the processor.

* * * * *